Feb. 12, 1957
E. G. RAGATZ
2,781,293
ABSORPTION RECOVERY OF HYDROCARBONS
Filed May 7, 1953
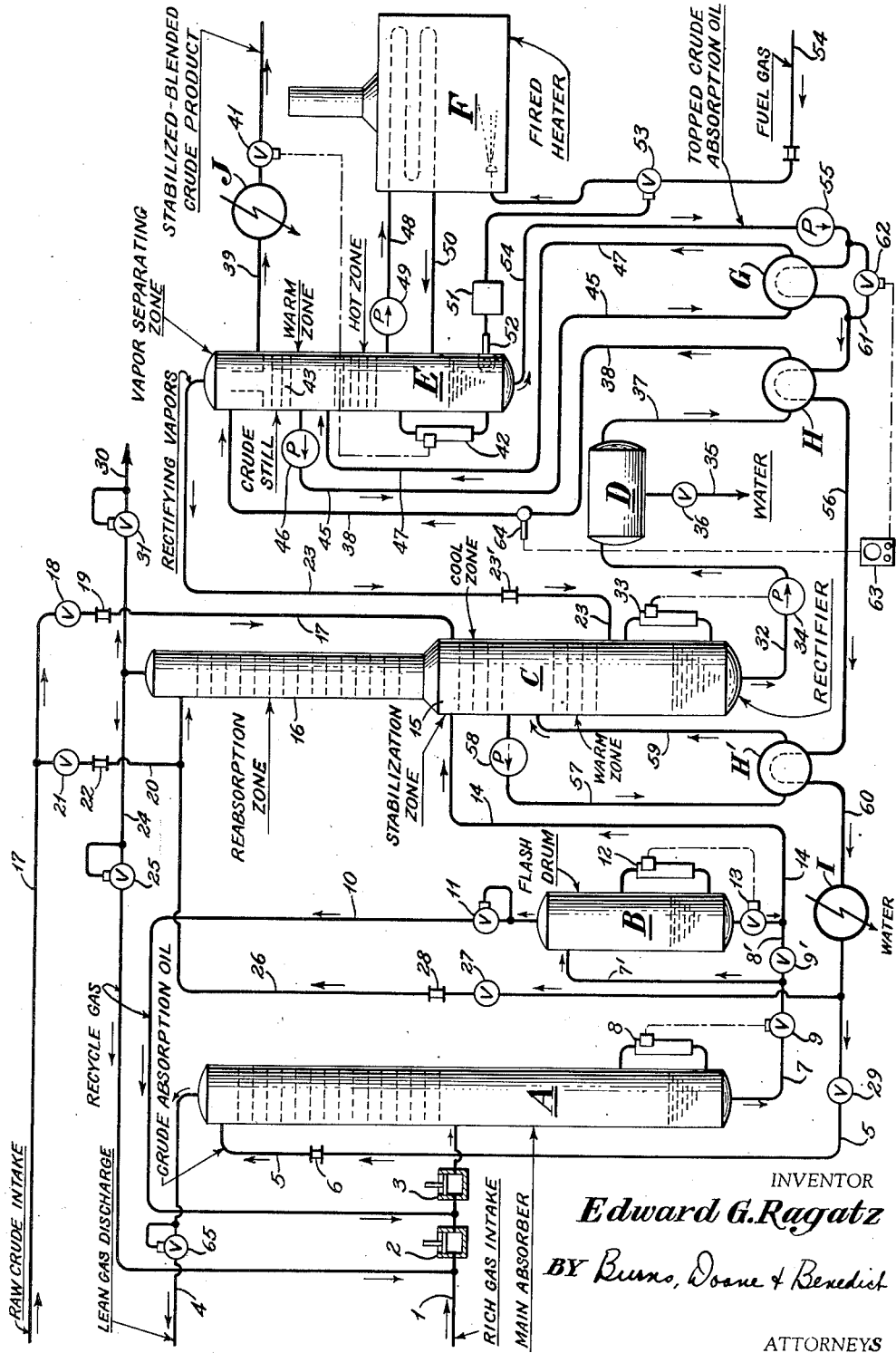
INVENTOR
*Edward G. Ragatz*
BY Burns, Doane & Benedict
ATTORNEYS United States Patent Office 2,781,293
Patented Feb. 12, 1957

2,781,293

ABSORPTION RECOVERY OF HYDROCARBONS

Edward Gray Ragatz, San Marino, Calif., assignor to Edw. G. Ragatz Co., San Marino, Calif., a partnership Application May 7, 1953, Serial No. 353,519

10 Claims. (Cl. 196—8)

This invention relates generally to a method and apparatus for absorption recovery of desired fractions from a hydrocarbon gas, and to the production of a stabilized crude-oil enriched by said recovered fractions. More specifically, it relates to a combination operation wherein desired fractions are absorbed in a topped crude-oil absorption medium, the enriched absorption medium blended with raw crude-oil, and the mixture rectified for the production of a stabilized enriched crude-oil product, with a portion of said stabilized product being subsequently topped for production of the absorption medium employed in said absorption recovery operation.

In the absorption recovery of desired fractions from field gases in remote domestic areas, and in foreign areas such as Venezuela and the Persian Gulf region, it is often found expedient to blend absorption-recovered products with a stabilized crude-oil for their effective and economical transportation as light fraction components thereof. This operation has been conventionally effected by stabilizing raw crude-oil, treating the vapors stripped therefrom along with rich field-gas in a conventional absorption unit separate from the crude-oil stabilizer, stabilizing the absorption-recovered product, and then blending the stabilized product with the stabilized crude-oil to produce an enriched stabilized crude-oil product having a sufficiently low vapor pressure to avoid excess vapor losses in the course of subsequent transportation to an ultimate destination. While this conventional operation is highly effective for recovering valuable gaseous components which would otherwise be discarded, its complexity is such as to require an extensive capital investment, which requirement often acts as a deterrent to the recovery of otherwise desirable low-boiling components of a field gas, particularly when dealing with smaller gas reserves.

The present invention accomplishes the recovery and retention of desirable components of a field gas to substantially the same degree attainable with the older, more complicated apparatus; but with the employment of far less equipment and at a material reduction in heat and power consumption. These extremely desirable objectives are achieved by combining the steps of separating absorbed fractions from the rich absorption medium, stabilizing the raw crude-oil, and blending the recovered fractions therewith, in such a manner as to eliminate all of the conventional separate crude-oil stabilization equipment as well as all of the condensing and liquid-refluxing equipment normally associated with the conventional absorption recovery system. As a result, a substantial saving can be effected in both initial plant investment and continuous operating expense.

It is a general object of the invention to effect an absorption recovery of desired fractions from a hydrocarbon-gas stream using a topped crude-oil absorption medium, and to subsequently transfer the recovered fractions to a stabilized crude-oil production stream.

It is a further object of the invention to effect said transfer by blending the rich absorption medium with a raw crude-oil stream, distilling undesirable fractions from the combined stream to effect stabilization thereof while retaining a maximum of desired fractions, and separating the resultant stabilized stream into a crude-oil product enriched with the desired fractions, and a topped crude-oil stream for use as the absorption medium.

It is a further object of the invention to employ a portion of the raw crude-oil as an absorption medium for the reabsorption treatment of vapors resulting from said stabilization operation whereby a high percentage retention of desired absorbed fractions is effected.

It is a further object of the invention to strip lighter fractions from a portion of the stabilized blend by appropriate application of "reboil" heat, and to employ the resulting topped vapors in stabilizing said blended stream of rich absorption-medium and raw crude-oil.

It is a further object of this invention to so manipulate the blending, stabilization, and topping operations, that the volume of topped crude-oil available for the absorption operation is independent of the volume of raw crude-oil charged to the plant, thereby making possible the attainment of any desired degree of absorption recovery of desired fractions.

It is another object of the invention to effect said blending and subsequent separation operations in such a manner that a substantial portion of the oil circulated through the topping still and associated reboil heater is constantly replaced with fresh crude-oil, thereby materially reducing the probability of deleterious thermal decomposition of the absorption oil due to any inadvertent development of high "tube surface" temperatures at the reboil heater.

It is another object of the invention to attain a high degree of heat recovery from the hot topped crude-oil by interchanging it, in series, first with a stream of partially topped crude-oil, and then with one or more streams of a partially stabilized blend of absorption medium and raw crude-oil.

It is another object of the invention to provide a high degree of fractionation flexibility in a process of the character described whereby a sharp cut can be made between selected components of an enriched crude-oil looking to the maximum inclusion of desired lower-boiling fractions in a stabilized crude blend of given limited vapor-pressure.

It is another object of the invention to protect the reboil heater of the topping step by removing free salt-water and extraneous solids from the partially stabilized crude blend, and by subsequently vaporizing any free water remaining therein, before introduction of the reboiler feed stream into said reboil heater.

It is another object of the invention to provide a combination of distillation apparatus which removes absorbed fractions from a rich topped crude-oil absorption medium while simultaneously blending said removed fractions with a raw crude-oil and stabilizing same, said apparatus including a hot topping zone, a warm topping zone, and a stabilizing zone, and means for passing hot topped crude-oil, in series, in indirect heat exchange, first with a partially topped crude-oil stream withdrawn from the warm topping zone and returned to the hot topping zone, and then with a blended crude-oil stream withdrawn from the stabilizing zone and returned to the warm topping zone.

In a broad embodiment, this invention comprises a method for recovering desired fractions from a hydrocarbon gas, removing undesired fractions from a raw crude-oil, and producing therefrom a stabilized crude-oil product enriched with said desired fractions, comprising the steps of absorbing the desired fractions in a topped crude-oil absorption medium, blending the rich absorption medium with crude-oil containing undesired low-boiling fractions, stabilizing the blend, recovering a portion thereof as a stabilized crude-oil product enriched with said desired fractions, topping the remaining portion to produce the topped crude-oil absorption medium, and passing vapors from the topping step in counter-current contact with the blend in effecting said stabilization thereof.

In a more specific embodiment the invention comprises a method for recovering desired fractions from a hydrocarbon gas, removing undesired fractions from a raw crude-oil, and producing therefrom a stabilized crude-oil product enriched with said desired fractions, comprising the steps of passing a raw crude-oil and an absorption enriched topped crude-oil (produced as hereinafter described) into a stabilizing zone, stripping undesired components therefrom, passing the stripped vapors through a reabsorption zone, passing vapors from the reabsorption zone together with an intake stream of field gas to a main absorption zone, passing rich crude-oil from the reabsorption zone to the stabilizing zone, removing the blend from the stabilizing zone, recovering a portion of fully stabilized blend as a stabilized crude-oil product enriched with said desired fractions, passing the remaining portion of the fully stabilized blend to a warm topping zone and thence to a hot topping zone, passing vapors from the warm topping zone into counter-current contact with the blend in said stabilizing zone in effecting stabilization thereof, removing hot topped crude-oil from the topping zone, passing the hot topped crude-oil in series in indirect heat exchange, first with a side-circulated stream of partially topped crude-oil and then with a stream of partially stabilized blend, returning the thus interchange-heated partially topped crude-oil to the hot topping zone, and a portion of the interchange-heated stabilized blend to the warm topping zone, further cooling the thus heat-interchanged topped crude-oil and passing it to the absorption zone as an absorption medium to absorb said desired fractions from the aforementioned combined gas streams, withdrawing rich topped crude-oil absorption medium from the absorption zone and passing it into said stabilizing zone as hereinbefore described, and introducing raw crude into the top of the reabsorption zone for reabsorption service therein.

The method of the present invention and the apparatus provided thereby are illustrated diagrammatically in the accompanying flow diagram, which is illustrative of one mode of carrying out the process of the invention and is not to be construed as limiting the invention to the exact flow shown.

The apparatus illustrated is shown as involving generally a main absorber A, a high-pressure flash drum B, a blended-crude rectifier C, a free-water knockout drum D, a crude-oil topping column E, a reboil heater F (preferably gas or oil fired), high, intermediate, and low temperature interchangers G, H and H', a lean-oil cooler I, and a product cooler J. Appropriate pumps, compressors, level controllers, etc., as required to carry out the operation, are indicated. Such additional equipment as may be needed, as well as specific structural details, will be apparent to one skilled in the art.

It is believed that the general nature, as well as the significance of the present invention, both as to method and apparatus, will be fully understood from the following detailed description, wherein the function and mode of operation of the apparatus is explained.

The rich field-gas intake, which often may be at a relatively low pressure, is brought into the system via line 1, increased in pressure by series-operated compressors 2 and 3, and introduced into the lower portion of main absorber A operating at a relatively high pressure. Absorber A may be of any conventional design comprising a vertical shell containing a plurality of horizontal vapor-liquid contacting elements such as bubble trays or the like conventionally employed for absorption-recovery of desired components from a rich-gas intake stream.

Cool topped crude-oil produced as hereinafter described is introduced into the upper portion of absorber A via line 5, where it serves as an absorption medium for recovery of desired fractions from the rich field gas; its flow being controlled by orifice meter 6 and valve 29. The thus-introduced absorption medium flows downwardly over the absorber trays in countercurrent flow to the uprising gas, extracting therefrom desired higher-boiling components such as butanes and higher, together with substantial volumes of undesired lower-boiling fractions. The resultant rich oil is withdrawn from absorber A via line 7 under control of conventional level-control means 8 actuating a motor valve 9 whereby a level of rich oil may be maintained in the base of absorber A. The remaining lean gas, comprising largely methane and ethane with variable small amounts of propane and heavier fractions, is withdrawn through line 4 under control of back-pressure regulator 65.

High-pressure flash drum B may be provided to partially eliminate the undesired low-boiling components dissolved in the rich oil when these fractions are present in large amounts. When employed, high-pressure flash drum B may consist of a vertical pressure-vessel into which the rich absorption oil passes via line 7' into the upper portion of said flash drum. Flash drum B will be operated at a lower pressure than main absorber A, with the consequence that a substantial amount of low-boiling fractions will be flashed from the rich oil upon entrance into said drum. In addition to their content of undesired low-boiling components, the vapors thus released from the rich oil will also contain a considerable amount of desired higher-boiling fractions. In order to prevent loss of these, the vapors released in flash drum B may be conducted via line 10 and valve 11 to an appropriate intake stage of the inlet compressor system, such as compressor 3, whereby said flashed vapors may be recycled through absorber A for recovery of desired fractions. The flashed rich topped crude-oil absorption medium is withdrawn from flash drum B under control of conventional liquid-level controller 12, actuating motor valve 13, and passed to rich-oil rectifier C via line 14. In cases wherein the undesired low-boiling content of the rich crude-oil absorption medium is relatively low, or if for other reasons it is not deemed expedient to operate flash drum B, the rich oil leaving the main absorber A may be conducted directly to rectifier C via the indicated by-pass valve 9' and line 8' joining directly with line 14.

Rectifier C comprises two primary processing zones; namely, a lower stabilization zone 15 and an upper reabsorption zone 16. Both zones may be equipped with conventional vapor-liquid contacting trays such as bubble trays, perforated trays, or the like; and the lower stabilization zone may be further divided into a cool upper and a warm lower zone.

Raw crude-oil containing both desired and undesired low-boiling components may be introduced into stabilization zone 15 through line 17, flow-regulating valve 18, and orifice meter 19. The raw crude oil and rich absorption medium from line 14 are then blended in the top of stabilizer column 15; or if deemed more expedient mechanically, these two streams may be equally well blended before being introduced into the stabilizer.

A portion of the raw crude-oil intake may also be passed through line 20, valve 21 and orifice meter 22, into the top of reabsorber 16, to serve as a reabsorption medium therein; with the rich-oil from this operation subsequently joining the aforesaid blend in the top of the stabilizing section. Also, under certain operating conditions, all of the raw-crude intake may be initially introduced into the top of the reabsorption zone.

The resultant blend of flashed rich crude-oil absorption medium and intake crude-oil flows downward through the trays in stabilization zone 15 in countercurrent contact with vapors introduced below the trays therein via line 23 and orifice meter 23'. As a result of the thus-developed countercurrent flow of liquid and vapors, undesired light fractions are stripped out of the downflowing combined stream. Since the vapors thus removed contain desired as well as undesired fractions, these vapors are conducted from stabilization zone 15 into reabsorption zone 16 for reabsorption recovery of their desired component content.

The reabsorption medium employed for the aforesaid desired component recovery from the stabilization-zone vapors may comprise a portion or all of the raw crude-oil intake as previously described. Under these circumstances the vapors leaving the reabsorption zone may still contain an appreciable quantity of desired fractions. These remaining fractions may then be recovered by conducting the vapors from reabsorption zone 16 via line 24 and pressure-regulating valve 25 to an appropriate suction stage of the rich-gas compressor system, such as the inlet of compressor 2, whereby said reabsorber vapors may be further contacted with lean topped crude-oil absorption medium at main absorber A along with the previously described streams of rich field-gas and recycled gas from high-pressure flash drum B.

In certain cases, particularly in those cases wherein it is not desired to recover a substantial amount of the lower-boiling fractions such as butane, and wherein a substantial demand for relatively low-pressure fuel gas exists, all of the raw-crude entering the system may be directly introduced into the top of the stabilization zone along with the rich crude-oil from the main absorber as previously described, and topped crude-oil employed as the reabsorption medium at reabsorption zone 16. Under these circumstances control valve 21 would be completely closed, and lean topped crude-oil introduced into the top of reabsorption zone 16 via line 26, control valve 27 and orifice meter 28. The resultant fuel gas would then be removed from the reabsorption zone via pressure-reducing valve 31 and conducted directly to a low-pressure fuel system via line 30, with valve 25 standing practically closed.

After the aforesaid counter-current contacting with rectifying vapors, the partially stabilized blend of intake crude-oil and rich absorption medium is withdrawn from stabilization zone 15 via line 32 under control of conventional level controller 33 operating to control the discharge rate of pump 34, whereby said blended crude-oil stream may be passed to knockout drum D for removal of its "free" salt water content via bleed valve 36 and water discharge line 35.

In certain cases, as described later, the down-flowing crude-oil blend may also be heated at an intermediate section of the rectifier by indirect heat-exchange with warm topped crude in interchanger H'.

The water-freed crude-oil blend is withdrawn from separator D via line 37, and thence circulated through intermediate-temperature interchanger H in indirect heat exchange with hot topped crude-oil. This interchange heating of the partially stabilized crude-oil blend results in a substantial vapor production, which vapors are "flashed" from the remaining, fully stabilized, blended crude-oil at an appropriate vapor-separating zone in the upper section of topping column E. These "flashed" vapors are combined with "topped" vapors withdrawn from the crude-still tray section, and conducted via line 23 and meter 23' into the lower section of rectifier C for counter-current contacting with the down-flowing crude-blend therein as previously described.

Through the combined inter-action of the crude reabsorption oil in section 16 with the rectifying vapors in section 15 of column C, an extremely sharp cut may be made between the desired and undesired lower-boiling fraction content of the crude-blend. This, in turn, results in the maximum-volume production of a stabilized crude-oil blend of given vapor pressure.

A portion of this stabilized crude stream is withdrawn as a final stabilized product from the separating zone in the top of column E through line 39 and passed through product cooler J under control of motor valve 41 actuated by conventional level controller 42 located in the base of topping column E. At product cooler J this finished product stream is cooled by indirect heat exchange with cooling water prior to transfer to an appropriate stock-tank, pipe-line, shipping vessel or other disposal outlet.

Topping column E is equipped with a plurality of conventional vapor-liquid column contacting trays of the character of bubble-cap trays or the like. That portion of the stabilized blend not withdrawn from the top of the column as a finished product is directed to flow downward over these trays in counter-current contact with an uprising vapor stream whereby its lighter fractions may be distilled out to produce the topped-crude absorption medium employed at absorber A. The vapors thus distilled overhead from column E are combined with the "flash" vapors separated from the finished production stream in the top of column E for conduction to the bottom of column C via line 23 as previously described.

Topping column E comprises a warm topping zone 43 and a hot topping zone 44. After traversing the warm topping zone 43, partially topped crude oil is withdrawn therefrom through line 45 and pump 46, circulated through hot interchanger G, and returned to hot topping zone 44 via transfer line 47. At hot interchanger G the warm partially-topped crude-oil flows in indirect counter-current heat exchange with hot fully topped crude-oil withdrawn from the base of crude-oil topping column E, whereby a substantial heat recovery is effected.

Oil is withdrawn near the base of column E through line 48, circulated through fired reboil-heater F by aid of oil-circulation pump 49, and returned to the base of the column through transfer line 50. The degree of heating effected at reboil-heater F whereby a proper topping effect may be imparted to the down-flowing crude-oil stream is controlled by temperature controller 51 actuated by a thermal element 52 immersed in a body of liquid oil maintained in the base of column E by liquid-level controller 42. With this temperature control, motor valve 53 on fuel-gas line 54 is adjusted via controller 51 to impart the needed amount of heat into the oil-stream circulated through fired-heater F.

The resultant hot-topped crude oil is withdrawn from column E and conducted by transfer line 54 to pump 55 whereby it may be circulated in series through hot interchanger G and warm interchanger H as previously described. A by-pass line 61 is provided around interchanger G, with a motor valve 62 controlled by temperature controller 63 having a thermocouple 64 located in line 38, whereby the temperature of the oil entering the top of the topping-still may be controlled by adjusting the temperature of the hot topped crude-oil sent to interchanger H through by-passing of a greater or lesser amount of hot topped crude around interchanger G. With this control, the amount of vapors "flashed" from the blended crude stream entering the top of column E may be accurately adjusted to provide an extremely close control on the vapor-pressure of the finished blended-crude product withdrawn therefrom via line 39.

From interchanger H, the partially cooled topped crude-oil may be conducted via line 56 to low-temperature interchanger H' for indirect heat exchange with a low-temperatured stream of partially stabilized crude oil withdrawn from and return to an intermediate tray section of stabilizing section 15 of column C as by line 57, pump 58, and line 59.

From interchanger H', the topped crude-oil is conducted via line 60 to final water cooler I, and thence to one or both of the system absorbers as previously described.

In connection with the above-described process flow, it should be specifically noted that:

1. The amount of topped crude-oil absorption medium which may be produced at column E is independent of the amount of raw crude-oil introduced into the system, and hence may be adjusted to provide as much absorption medium as required to give any desired degree-of-recovery at main absorber A.

2. By employment of high-temperature topping column E with its fired reboil heater F, the topped crude-oil employed at main absorber A may be sufficiently denuded of light ends to provide a high recovery efficiency at A, particularly at the higher absorber pressures.

3. Employment of free-water knockout drum D on the stream of rectifier bottoms, coupled with the distillation effected in the tray-section of column E, assures that no salt-containing free water enters fired heater F. This obviates any danger of deleterious salt deposition in the fired-heater tubes due to vaporization of free-water therein.

4. By employing the vapors distilled from the topped crude at column E for rectification service at column C, facilities for conventional condensation of said vapors are eliminated, and the net heat requirements for effecting a sharp cut between desired and undesired fractions of the crude-oil blend are materially reduced.

5. Series circulation of the hot topped crude-oil first through hot interchanger G, then through intermediate-temperature interchanger H, and finally through low-temperature interchanger H', assures a corresponding high-degree of heat recovery from the topped crude-oil stream leaving column E.

6. The process operates without any of the vapor-condensing, reflux accumulating, and reflux pumping equipment required with conventional plants. All necessary heat removal is effected from liquid-streams only at two coolers, namely, product cooler J and topped crude-oil cooler I.

In operation, the pressure on absorber A will normally be set rather high (i. e. 250 p. s. i. g. or higher) for the reduction of absorption-oil circulation requirements and/or introduction of the lean gas into a sales pipeline. The pressure on the topping and rectifying column combination, on the other hand, will always be set relatively low to permit adequate topping of the recirculated crude without exceeding its incipient cracking temperature.

With these pressures set, routine control of the equipment operation may then be maintained as follows:

(a) Depth of topping for production of a desired quality of crude-oil absorption medium may be controlled by adjusting the temperature setting on the oil body carried in the base of column E—which temperature, as previously described, may be maintained at the desired level by conventional temperature controller 51 actuating fuel-gas control motor-valve 53. Since it is normally desired to top the absorbent-crude rather deeply, this temperature may often be set at a level just safely below incipient cracking.

(b) Degree of rectification for production of a desired blended-crude vapor pressure may be controlled by maintaining an appropriate temperature setting on the blended-oil stream leaving interchanger G. Normally this temperature may be maintained, as previously described, by temperature controller 63 actuating motor valve 62 to bypass a portion of the hot topped-crude stream around interchanger G. Under certain conditions as discussed later, however, the stream intake to valve 62 may be from the topped-crude stream leaving interchanger G—with this valve-controlled by-pass stream then being conducted directly to the inlet to cooler I.

(c) Degree of absorption recovery for attainment of a desired component yield may be controlled by maintaining an appropriate rate-of-flow of topped crude to absorber A by aid of valve 29 and flow meter 6 as previously described.

(d) Degree of component retention at reabsorber section 16 of column C may be controlled by maintaining an appropriate rate-of-flow of reabsorption medium to the top of the column via control valves 21 or 27 as previously described—with the medium choice as between raw or topped crude being largely determined by the volume of local fuel-gas demand and/or the field-delivered value of said gas. If the local demand is large and/or the price low, then topped crude will be employed at the reabsorber and the resultant low-pressure fuel gas consumed locally or flared; while if the reverse holds, raw crude may be employed at the reabsorber with all re-absorber effluent gas being recompressed and retreated at the main absorber.

As previously described, "primary" heat is imparted to the distillation system via fired-heater F operating as a reboiler for topping column E. The resultant operation yields two fluid streams from which heat may be recovered, namely, a stream of medium-temperatured vapors withdrawn from the upper, coolest, section of column E, and a stream of high-temperatured topped crude withdrawn from the lower, hottest, section of column E. As previously described, the withdrawn vapor stream is always employed in its entirety for rectification service at column C with a consequent high recovery of its heat content.

Since the topped-crude stream is withdrawn from the hottest section of column E, a portion of its available heat can be recovered for re-employment in the topping operation as per the previously described exchange at interchanger G. Another portion may be employed at column C by aid of interchangers H and H', while a final substantial portion will always have to be discarded at cooler I for attainment of a final efficient absorbant temperature.

The degree of absorption-recovery desired, ratio of absorbant circulation to raw-crude intake, and gravity of the raw crude, all have a shifting effect on the optimum distribution of topped-crude heat as between interchangers G, H and H', and water cooler I. Differences in this heat distribution, and their consequent effect on the interchanger arrangement and control, may be exemplified by the following two widely contrasting conditions:

(a) All of the sensible heat content of the topped-crude above the temperature level of an intermediate tray of column C can be effectively employed at columns E and C.

This situation calls for bypassing of a varying portion of the hot topped-crude stream around interchanger G for control of the finished product vapor-pressure, and employment of interchanger H' for effecting maximum heat recovery.

(b) The sensible heat content of the topped-crude above the temperature level of an intermediate tray of column C is substantially more than can be effectively employed at columns E and C.

In contrast, this situation calls for a full-flow of topped crude through interchanger G, elimination of interchanger H', and by-passing of a variable quantity of tapped crude from the outlet of interchanger G direct to the inlet of cooler I as previously described.

As an example of a normally encountered operation of the subject process, the treatment of 6,000,000 cu. ft./day of rich field gas with 1,200 barrels/day of raw crude-oil may be considered. In this particular operation the rich gas contained 1.8 gallons/1,000 cu. ft. of isobutane and heavier fractions. When treated with 1200 barrels/day of 0.81 specific gravity raw crude-oil, as per the accompanying process flow, the resultant overall recovery of butanes-plus from the gas amounted to approximately 10,000 gallons/day, with the following operating conditions being maintained in the key portions of the plant equipment:

Main absorber pressure 670 lbs. gauge; flash drum pressure, 180 lbs. gauge; rectifying and topping column pressures, 40 lbs. gauge; topped crude-oil circulation at main absorber, 1,600 barrels/day; temperature increase of partially stabilized blend through the warm interchanger, 180° F. to 210° F.; temperature of stabilized blended crude-oil product passed to product cooler, 210° F.; temperature increase of reboil stream through fired heater, 465° F. to 540° F.; temperature of topped crude-oil withdrawn from topping column, 540° F.; temperature increase of partially topped crude-oil stream through hot interchanger, 300° F. to 390° F.; net fired-heater duty, 2,600,000 B. t. u./hour; stabilized blended crude-oil product cooler duty 100,000 B. t. u./hour; topped crude-oil cooler duty 1,100,000 B. t. u./hour; vapor pressure of the stabilized crude-oil product, 14.7 lbs. absolute at 70° F.

In the topping step of this example, sufficient pentanes and lighter have been topped out of the recirculated crude to make a thoroughly effective absorption medium as shown by the resultant recoveries.

I claim as my invention:

1. A method for recovering desired fractions from a hydrocarbon gas, removing undesired fractions from a raw crude-oil, and producing therefrom a stabilized crude-oil product enriched with said desired fractions, comprising the steps of absorbing the desired fractions from said gas in an absorption medium consisting essentially of lean topped crude-oil in a main absorption zone, blending the rich absorption medium with a crude-oil stream containing undesired low-boiling fractions, stabilizing the blend in a stabilizing zone, recovering a portion thereof as a stabilized crude-oil product enriched with said desired fractions as the only liquid product of the process, topping the remaining portion in a fractional distillation topping zone to produce said topped crude-oil absorption medium, passing the hot vapors without substantial condensation from the topping zone in countercurrent contact with the blend in effecting said stabilization thereof, passing the resulting hot topped crude-oil in indirect heat interchange with a stream of partially topped blend withdrawn from a cooler part and returned to a hotter part of the topping zone, passing the topped crude-oil from this interchange step in indirect heat interchange with a stream of the blend withdrawn from the stabilizing zone, returning vapors evolved from the thus heated blend to the stabilizing zone, and further cooling the hot-topped crude-oil before passing it to the main absorption zone as said absorption medium.

2. The process of claim 1 wherein the crude-oil blend withdrawn from the stabilizing zone is introduced into a free-water knock-out zone, and free water separated therefrom, prior to effecting said indirect heat exchange with the hot topped crude-oil.

3. The process of claim 1 wherein the topped crude-oil from the last-mentioned interchange step is passed in indirect heat interchange with partially stabilized blend from the stabilizing zone, and the thus interchanged topped crude-oil is further cooled, said side stream of partially stabilized blend being withdrawn from an upper portion of the stabilizing zone, passed through the last-mentioned interchange step and returned to a lower section of said stabilizing zone.

4. The process of claim 1 wherein vapors removed from the stabilizing zone are passed in countercurrent contact with a reabsorption medium in a reabsorption zone, and rich oil from the reabsorption zone is introduced into said stabilization zone.

5. The process of claim 4 wherein the reabsorption medium is raw crude-oil.

6. The process of claim 4 wherein the reabsorption medium is cooled topped crude-oil.

7. A method for recovering desired fractions from a hydrocarbon gas, removing undesired fractions from a raw hydrocarbon-liquid well-stream, and producing therefrom a stabilized liquid well-product enriched with said desired fractions, comprising the steps of absorbing the desired fractions in an absorption medium consisting essentially of lean topped liquid well-product, blending the resultant rich absorption medium with a hydrocarbon-liquid well-stream containing undesired low-boiling fractions, stabilizing the blend, recovering a portion thereof as a stabilized liquid-product enriched with said desired fractions, topping the remaining portion of the stabilized blend in a fractional distillation step to produce the said topped absorption medium, and passing the hot vapors without substantial condensation directly from the topping to the stabilizing step in effecting said stabilization of the first-said blend.

8. The process of claim 7 wherein the recovered portion of the stabilized blend contains all finally retained low-boiling fractions to yield a single stabilized liquid-product stream from the recovery operation.

9. The process of claim 7 wherein a fully fractional-distilled topped liquid-product stream is passed in indirect heat-exchange with a stream of partially-topped stabilized blend.

10. The process of claim 7 wherein desired fractions remaining in vapors resulting from said blend stabilization are recovered by subsequent reabsorption, and the resultant rich reabsorption medium stabilized along with the first-said blend.

References Cited in the file of this patent
UNITED STATES PATENTS

| Number | Name | Date |
|---|---|---|
| 2,093,279 | Keith | Sept. 14, 1937 |
| 2,286,453 | Angell | June 16, 1942 |
| 2,322,635 | Keith | June 22, 1943 |
| 2,325,813 | Throckmorton | Aug. 3, 1943 |
| 2,327,187 | Hill | Aug. 17, 1943 |
| 2,388,732 | Finsterbusch | Nov. 13, 1945 |

OTHER REFERENCES

Stormont: Oil and Gas Journal, Feb. 24, 1949, pages 124–129 (page 125 only needed).

Glendening et al.: Petroleum Engineer, vol. 22, pages C–54–56, and 58–60, May 1950 (page C–54 only needed).

Ragatz: Petroleum Refiner, vol. 30, No. 12, December 1951, pages 143–148 (page 145 only needed).